US012341294B2

(12) United States Patent
Palmer

(10) Patent No.: US 12,341,294 B2
(45) Date of Patent: Jun. 24, 2025

(54) LOCKING POWER CORD RECEPTACLE

(71) Applicant: Honeywell Federal Manufacturing & Technologies, LLC, Kansas City, MO (US)

(72) Inventor: Brian Edward Palmer, Olathe, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 375 days.

(21) Appl. No.: 17/867,165

(22) Filed: Jul. 18, 2022

(65) Prior Publication Data

US 2023/0344171 A1 Oct. 26, 2023

Related U.S. Application Data

(60) Provisional application No. 63/332,726, filed on Apr. 20, 2022.

(51) Int. Cl.

| | |
|---|---|
| ***H01R 13/639*** | (2006.01) |
| ***H01R 13/64*** | (2006.01) |
| ***H01R 24/30*** | (2011.01) |
| ***H01R 24/78*** | (2011.01) |

(52) U.S. Cl.
CPC ..... *H01R 13/6392* (2013.01); *H01R 13/6397* (2013.01); *H01R 13/64* (2013.01); *H01R 24/30* (2013.01); *H01R 24/78* (2013.01)

(58) Field of Classification Search
CPC .. H01R 13/6392; H01R 13/642; H01R 13/64; H01R 13/6397; H01R 13/453; H01R 13/447; H01R 24/30; H01R 24/78; H01R 13/4532; H01R 13/6395
USPC ............................ 439/346, 38–40, 305, 139
See application file for complete search history.

(56) References Cited

U.S. PATENT DOCUMENTS 5,096,432 A * 3/1992 Cullen .............. H01R 13/4532 439/139
9,614,322 B1 * 4/2017 Gibboney, Jr. ........ H01R 13/64
2004/0203270 A1 * 10/2004 Wang ................ H01R 13/4534 439/136
2019/0199031 A1 * 6/2019 Surana .................. H01R 13/64

* cited by examiner

*Primary Examiner* — Christopher M Koehler
*Assistant Examiner* — Gregory L Mangot
(74) *Attorney, Agent, or Firm* — Hovey Williams LLP

(57) ABSTRACT

A locking power cord receptacle configured to receive an electric power cord plug that includes a ground pin comprises a base receptacle and a locking assembly. The base receptacle includes a first female connector, a second female connector, and a ground female connector positioned on an upper surface and arranged to receive the power cord plug. The base receptacle further includes a body cavity on the upper surface. The locking assembly has a locked state in which the locking assembly blocks access to the base receptacle and an unlocked state in which the power cord plug can be plugged in to the base receptacle. The locking assembly includes a locking cover and a locking component. The locking cover includes a disc and a sleeve coupled to the disc and the base receptacle. The locking component is retained in the body cavity and has a locked configuration and an unlocked configuration.

20 Claims, 12 Drawing Sheets

LOCKING POWER CORD RECEPTACLE

RELATED APPLICATION

The current patent application is a non-provisional patent application claiming priority benefit, with regard to all common subject matter, to U.S. Provisional Application No. 63/332,726, entitled "LOCKING POWER CORD RECEPTACLE", and filed Apr. 20, 2022. The earlier-filed provisional application is hereby incorporated by reference, in its entirety, into the current document.

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to receptacles that receive an electrical power cord and include a locking mechanism that requires a ground pin to unlock it.

BACKGROUND

An electrical power cord (from an appliance or device) or an extension cord often includes a plug with three electrically conductive male-type connectors, sometimes known as "prongs", with two extended blade connectors which carry varying electric voltage and/or electric current and one ground pin that provides electrical ground, which thus form a "three-prong" power cord. Sometimes the ground pin is missing or has been removed. Plugging a cord with a missing ground pin into a receptacle, such as a wall outlet or a female-type extension cord connector, creates hazards that could result in potential electrical shock, electrostatic discharge, or electrical arcing. In some environments, these hazards may trigger events that cause device and/or property damage and/or that may lead to personal injury or death.

SUMMARY OF THE INVENTION

Embodiments of the current invention address one or more of the above-mentioned problems and provide a locking power cord receptacle into which an electrical power cord plug or an extension cord plug is plugged. The locking power cord receptacle at least reduces the possibility of the above-mentioned hazards occurring because it tries to prevent a power cord or extension cord with a missing ground pin from being plugged in. The locking power cord receptacle includes a locking mechanism which requires the ground pin to unlock the mechanism and allow the cord plug to be plugged into the receptacle.

One embodiment of the locking power cord receptacle broadly comprises a base receptacle and a locking assembly that is normally in the locked position unless it has been properly unlocked by a ground pin during the insertion of a three-prong power cord. The base receptacle includes a first female connector, a second female connector, and a ground female connector, each connected to standard electrical wiring and including an opening positioned on an upper surface and arranged to receive the three-prong electric power cord plug. The base receptacle further includes a body cavity positioned on the upper surface for a locking component or components to reside and also a feature to enable a spring or spring-like component to be installed for returning the overall mechanism assembly to a locked state when a three prong electrical cord is not inserted. The outer locking assembly has an at-rest locked state in which the locking assembly blocks access to the base receptacle and an unlocked state in which the electric power cord plug can be fully plugged in to the base receptacle. The locking assembly includes a locking cover disc, an internal locking component or components, a spring component, and an outer sleeve serving as a containment housing. The locking cover includes a disc and a sleeve. The thin, access-controlling disc covers the connectors of the base receptacle when the locking assembly is in the locked state. The disc includes typical openings for standard three prong electrical plug prongs and an internal cover cavity for the locking component. The outer sleeve is connected to the base receptacle and allows rotation of the thin locking disc against the base receptacle. The locking component is retained in the body cavity in the base receptacle during use and engages also into the thin locking disc when in the locked-access position. More specifically, the locking component extends into both the base receptacle and the internal cover disc cavity when in the locked position and compresses or moves entirely into the base receptacle during the unlocked configuration to enable the locking cover to rotate and change the state of the locking assembly. The locking component is configured to allow it to be pressed by a ground pin of a typical three prong electrical plug to change from the locked configuration to the unlocked configuration.

Another embodiment of the locking power cord receptacle comprises a base receptacle and a locking assembly. The base receptacle includes a first female connector, a second female connector, and a ground female connector, each including an opening positioned on an upper surface and arranged to receive the electric power cord plug. The base receptacle further includes a body cavity positioned on the upper surface. The locking assembly has a locked state in which the locking assembly blocks access to the base receptacle and an unlocked state in which the electric power cord plug can be plugged in to the base receptacle. The locking assembly includes a locking cover and a locking component. The locking cover includes a disc which covers the connectors of the base receptacle when the locking assembly is in the locked state. The disc includes a cover cavity, a first connector opening, a second connector opening, and a ground pin opening. The first connector opening is configured to receive a first blade connector of the electric power cord plug. The second connector opening is configured to receive a second blade connector of the electric power cord plug. The ground pin opening is configured to receive the ground pin. The sleeve is connected to the disc and rotatably coupled to the base receptacle. The locking component is retained in the body cavity in the base receptacle. The locking component has a locked configuration in which a portion of the locking component extends into the cover cavity and an unlocked configuration in which the portion of the locking component retracts from the cover cavity and the locking cover is able to rotate and change the state of the locking assembly.

Another embodiment of the current invention provides a locking wall outlet configured to receive one or more electric power cord plugs, with each electric power cord plug required to have a ground pin. The locking wall outlet comprises first and second base receptacles and first and second locking assemblies to control access to the base receptacle connections. The first and second base receptacles are coupled to one another for typical wall outlet installations. Each base receptacle includes a first female connector, a second female connector, and a ground female connector, with each connector including an opening positioned on an outer surface and arranged to receive one electric power cord plug with three electrical prongs. Each base receptacle further includes a body cavity positioned on the outer surface. The first locking assembly is associated and operational with the first base receptacle. The second locking assembly is associated and operational with the second base receptacle. Each locking assembly has a locked state in which the locking assembly blocks access to the associated base receptacle and an unlocked state in which a three prong electric power cord plug can be fully plugged in to the associated base receptacle. Each locking assembly includes a locking cover, a locking component or components and a spring to return the assembly to the locked position when a three prong electrical plug is not in use. The locking cover includes a disc and an outer sleeve or containment housing at each receptacle. The disc covers the connectors of the associated base receptacle when the locking assembly is in the locked state. The disc includes a cover cavity for the locking component or components. The outer sleeve is connected to the base receptacle and enables access controlled disc rotation over each base receptacle. The locking component or components is retained in the body cavity in the associated base receptacle when the access controlling disc is rotated to the unlocked position. The locking assembly has a locked configuration in which a portion of the locking component or components extends into both the cover cavity and the cavity in the base and also an unlocked configuration in which the locking component or components fully retract from the cover cavity and the locking cover is able to rotate and change the state of the locking assembly. The locking component or components are pressed by a ground pin of a proper three pronged plug to change the assembly from the locked configuration to the unlocked configuration.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 8 is a side sectional view of the locking power cord receptacle, cut along line 8-8 of FIG. 7, with the electric power cord plug in preparation to unlock the locking assembly and be plugged in;

Figure 1:
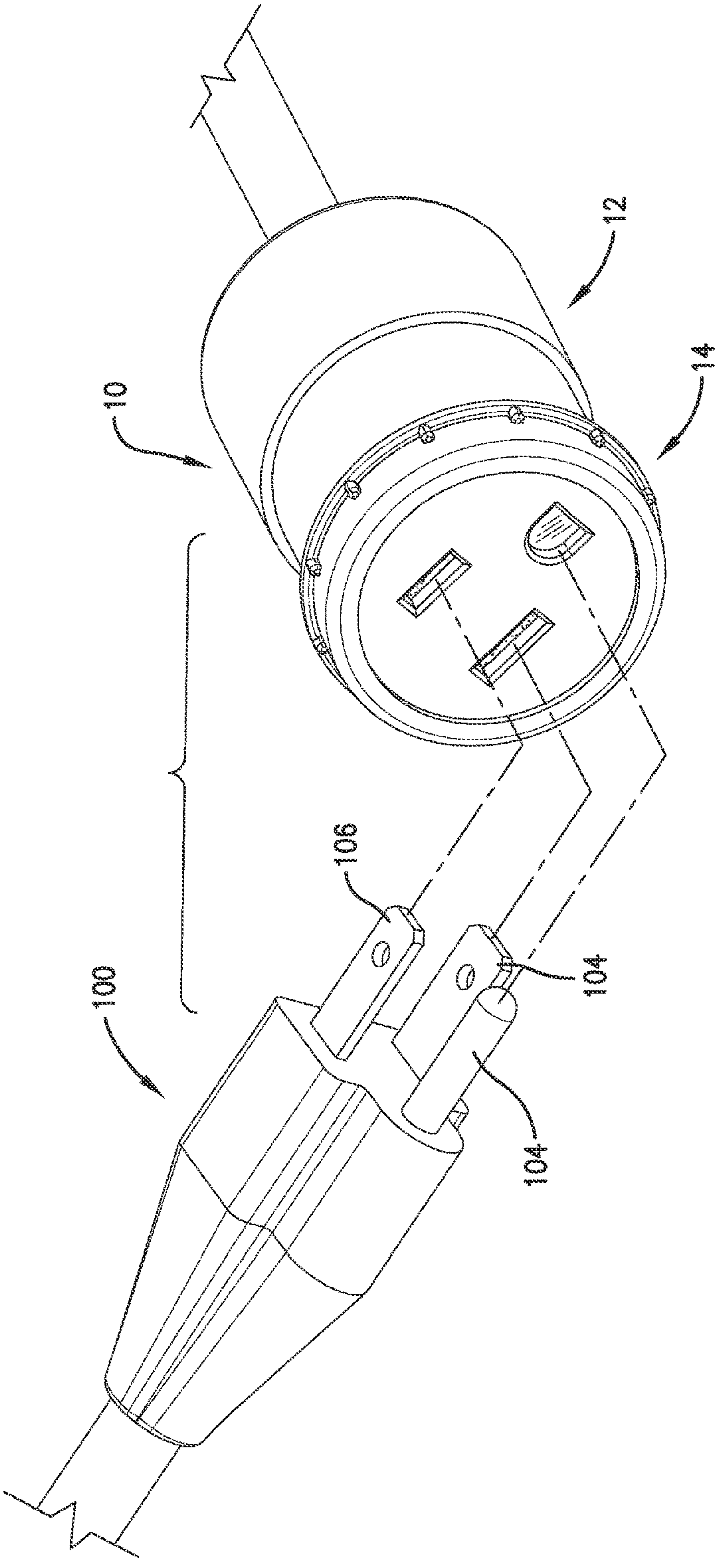
FIG. 1 is a perspective view of a locking power cord receptacle, constructed in accordance with various embodiments of the invention, the locking power cord receptacle configured to receive an electric power cord plug that includes a ground pin and two prongs.
Figure 2:
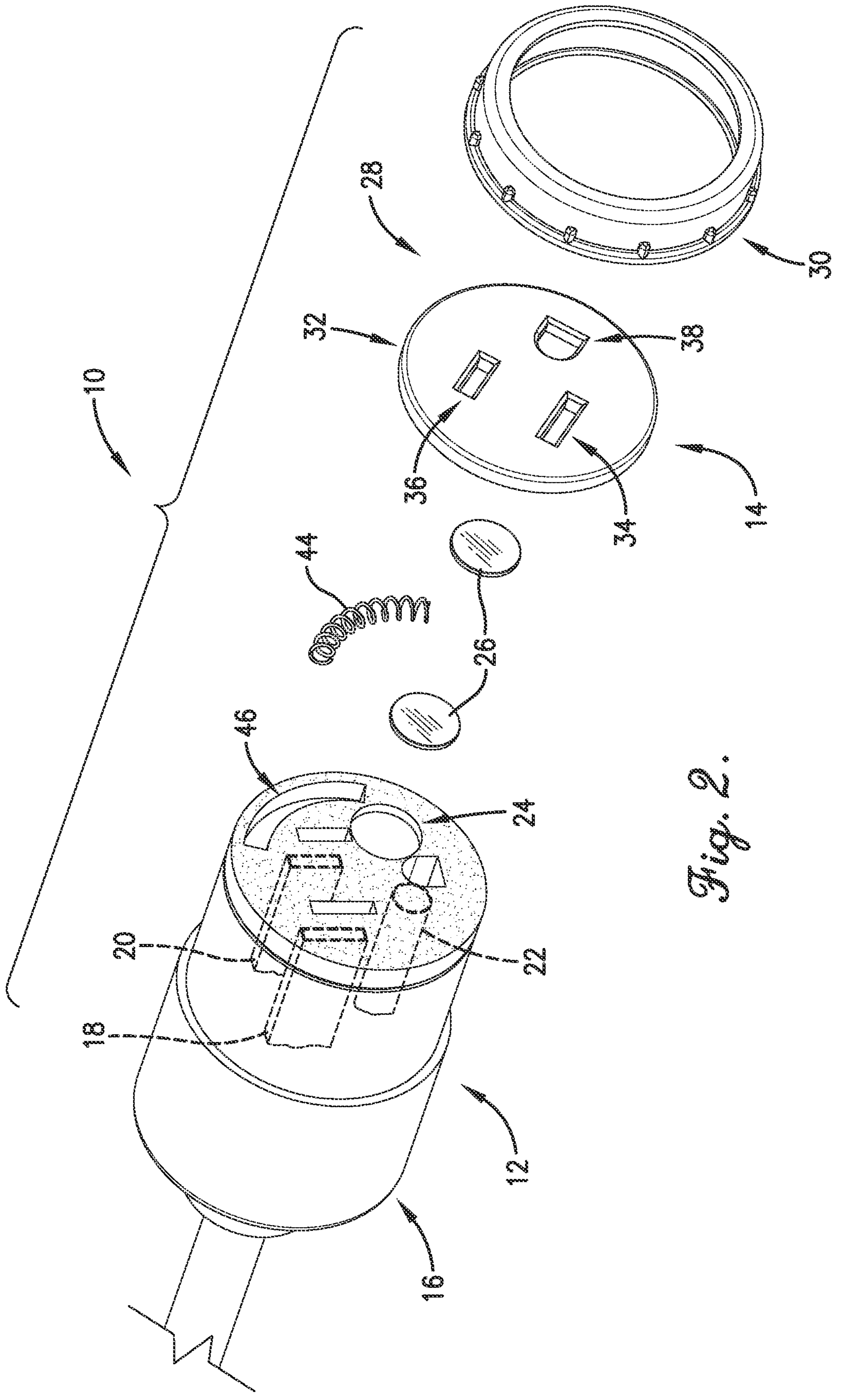
FIG. 2 is a perspective exploded view from a first end of the locking power cord receptacle showing a base receptacle and components of a locking assembly including a locking cover with a locking sleeve and a disc, a locking component, and a return mechanism.
Figure 3:
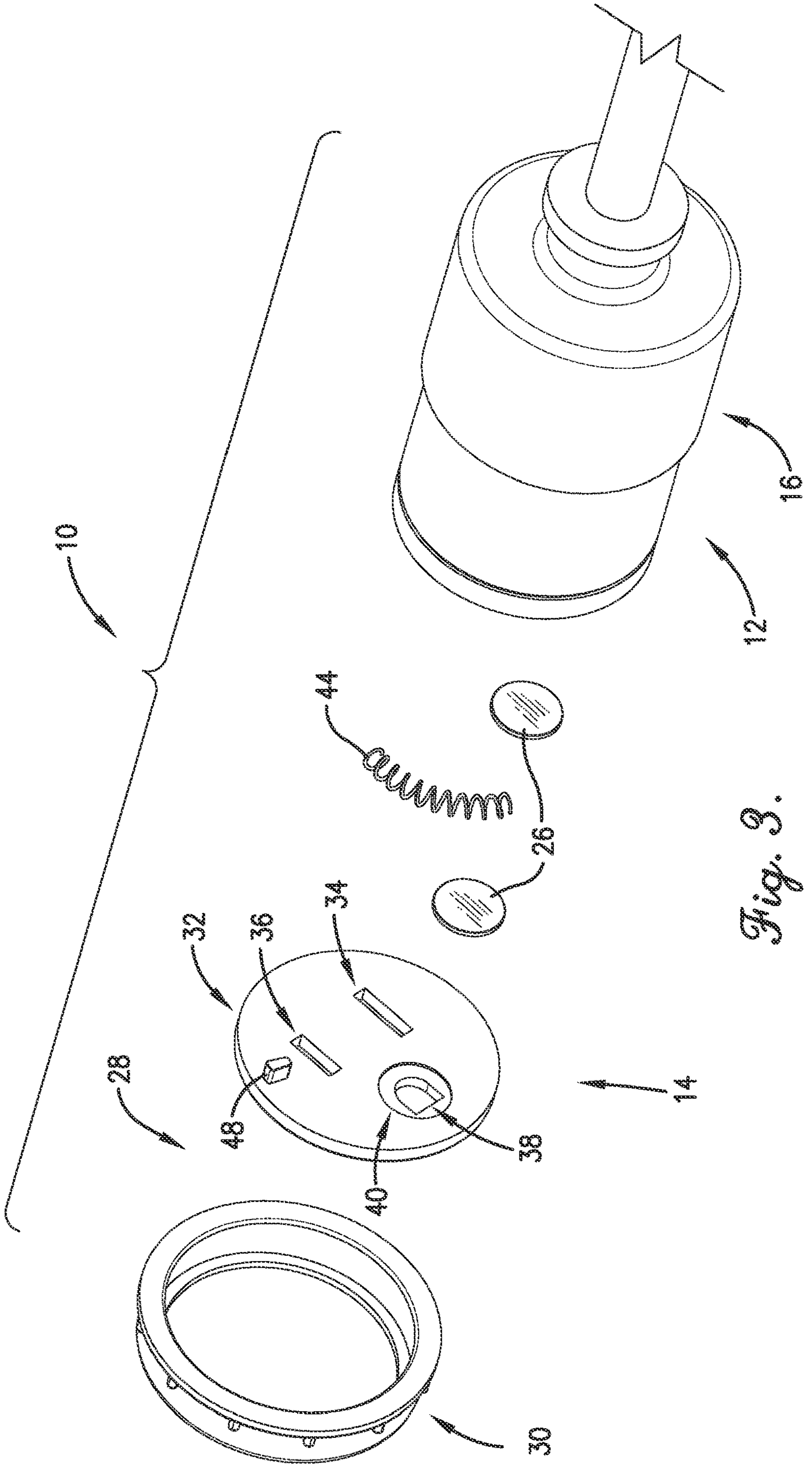
FIG. 3 is a perspective exploded view from a second end of the locking power cord receptacle showing the base receptacle and the same components as in FIG. 2.

The drawing figures do not limit the current invention to the specific embodiments disclosed and described herein. For example, the spring design in the drawings is meant to be representative of any spring design that creates the rotation of the access-controlling discs back to the locked position in any and all embodiments of the invention upon removal of an electrical plug. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

A locking power cord receptacle 10, constructed in accordance with various embodiments of the current invention, for preventing unsafe electrical connections is shown in FIGS. 1-14. The locking power cord receptacle 10 broadly comprises a base receptacle 12 and a locking assembly 14. The locking assembly 14 exists in either a locked state or an unlocked state. When the locking assembly 14 is in the locked state, access to the base receptacle 12 is blocked by the locking assembly 14. The locking assembly 14 is placed in the unlocked state only by an electric power cord plug 100 that includes a ground pin 102. When the locking assembly 14 is in the unlocked state, the electric power cord plug 100 may be plugged into the base receptacle 12.

The electric power cord plug 100 is a standard three-prong power cord, such as a cord connected to an appliance or a device or an extension cord. The electric power cord plug 100 includes three electrically conductive male-type connectors, or prongs, with a first blade connector 104 (also known as a "neutral" connector), and a second blade connector 106 (also known as a "line" connector), each of which carry varying electric voltage and/or electric current, and the ground pin 102 that provides electrical ground.

The base receptacle 12 includes a body 16, a first female connector 18, a second female connector 20, and a ground female connector 22. The body 16 generally provides a structure to retain the first female connector 18, the second female connector 20, and the ground female connector 22, also known as "the receptacle connectors" 18, 20, 22. The body 16 is formed from electrically insulating materials including hardened polymers, ceramics, glass, or other materials which surround the receptacle connectors 18, 20, 22. The body 16 includes at least an upper surface on which openings for the receptacle connectors 18, 20, 22 are positioned and accessed.

The first female connector 18 is configured to receive the first blade connector 104, and the second female connector 20 is configured to receive the second blade connector 106. The first female connector 18 and the second female connector 20 are each formed from electrically conductive material, such as metals and/or metal alloys. The first female connector 18 and the second female connector 20 each may include four thin side walls connected to one another to form a rectangular cross sectional shape. The cross sectional shape of the first female connector 18 is sized appropriately to receive the first blade connector 104, and the cross sectional shape of the second female connector 20 is sized appropriately to receive the second blade connector 106.

The ground female connector 22 is configured to receive the ground pin 102 and is formed from electrically conductive material, such as metals and/or metal alloys. The ground female connector 22 includes a flat side wall connected to an arcuate side wall to form a D cross sectional shape.

The first female connector 18, the second female connector 20, and the ground female connector 22 are shaped, sized, and positioned to correspond to standard U.S. grounded receptacles, such as a National Electrical Manufacturers Association (NEMA) 5-15R receptacle.

Furthermore, the base receptacle 12 is electrically connected to wiring or cabling. That is, the first female connector 18 is electrically connected to a first (electrically conductive) wire or cable. The second female connector 20 is electrically connected to a second wire or cable, and the ground female connector 22 is electrically connected to a third wire or cable.

The locking assembly 14 includes a body cavity 24, a locking component 26, and a locking cover 28. The body cavity 24 generally retains at least a portion of the locking component 26. The body cavity 24 is a depression, or recessed area, on the upper surface of the body 16 of the base receptacle 12 that is positioned adjacent to the second female connector 20 and the ground female connector 22. The body cavity 24 has a depth which can accommodate or retain all of the locking component 26 when the locking assembly 14 is in the unlocked state.

The locking component 26 has a locked configuration, which prevents the locking cover 28 from rotating, and an unlocked configuration, which allows the locking cover 28 to rotate. The locking component 26 is normally in the locked configuration. The locking component 26 may be manipulated, such as by being compressed, to transition to the unlocked configuration. Thus, the locking component 26 is formed from resilient components that are urged or biased to maintain the locked configuration. Examples of the locking component 26 may be formed from first and second magnets that are positioned and oriented to repel one another, a spring coupled to a solid object such as a cylinder, a naturally resilient material, such as rubber, that is (cylindrical) shaped to fit in the body cavity 24, or the like.

If the locking component 26 includes magnets, the first and second magnets may be naturally spaced apart from one another in the locked configuration by having the same magnetic poles face one another. To change to the unlocked configuration, the first magnet may be physically pushed toward the second magnet, so that the first magnet is moved to a different position.

If the locking component 26 includes a spring and a cylinder, the spring may be at rest or slightly compressed in the locked configuration. To change to the unlocked configuration, the cylinder may be pushed in order to compress the spring and allow the cylinder to be moved to a different position.

If the locking component 26 includes a rubber cylinder, the rubber cylinder may be at rest in the locked configuration. To change to the unlocked configuration, the rubber cylinder may be pressed in order to reduce its length so that one end of the rubber cylinder is moved to a different position.

The locking cover 28 either prevents or allows access to the base receptacle 12 depending on its rotational angular position relative to the base receptacle 12. In a first rotational angular position relative to the base receptacle 12, a locked position, the locking cover 28 prevents access to the base receptacle 12. In a second rotational angular position relative to the base receptacle 12, an unlocked position, the locking cover 28 allows access to the base receptacle 12. The locking cover 28 includes a sleeve 30, a disc 32, a first connector opening 34, a second connector opening 36, a ground pin opening 38, a cover cavity 40, and a return mechanism 42.

The sleeve 30 includes a single cylindrical side wall which is rotationally coupled to the body 16 such that the sleeve 30 overlaps, and rotates about, a portion of a side surface of the body 16. The sleeve 30 is formed from rigid material and may include raised surface features to provide an easier and improved grip when rotating the locking cover 28.

The disc 32 has a generally circular shape including an upper surface, a lower surface, and a circumference that is attached to an inner surface of the sleeve 30 at an upper edge thereof. The disc 32 also includes a plurality of openings, each extending from the upper surface to the lower surface. The openings include the first connector opening 34 which is configured to allow the first blade connector 104 to pass through the disc 32, the second connector opening 36 which is configured to allow the second blade connector 106 to pass through the disc 32, and the ground pin opening 38 which is configured to allow the ground pin 102 to pass through the disc 32. Like the receptacle connectors 18, 20, 22, the first connector opening 34, the second connector opening 36, and the ground pin opening 38 are shaped, sized, and positioned to correspond to standard U.S. grounded receptacles, such as the NEMA 5-15R receptacle.

The cover cavity 40 generally retains a portion of the locking component 26 when the locking component 26 is in the locked position. The cover cavity 40 is a depression, or recessed area, on the lower surface of the disc 32 that is positioned generally aligned with the ground pin opening 38. The cover cavity 40 has a depth sufficient to retain only a portion of the locking component 26.

The return mechanism 42 generally urges, forces, or returns the locking cover 28 to its locked position and, by default, allows the locking component 26 to return to its locked position when the electric power cord plug 100 is removed from the electrical power cord receptacle 10. The return mechanism 42 generally includes a resilient component 44 that rotates the locking cover 28 from the (unlocked) second rotational angular position to the (locked) first rotational angular position after the electric power cord plug 100 is unplugged, i.e., removed from the base receptacle 12. An exemplary embodiment of the return mechanism 42 includes the resilient component 44, a return channel 46, and a return tab 48. The resilient component 44 includes a spring although other resilient parts, such as a rubber rod, that return to their original shape after being compressed or placed in tension. The return channel 46 includes a cavity or recess in which the resilient component 44 is retained. The return channel 46 may be formed in the upper surface of the base receptacle 12 or the lower surface of the disc 32. The return tab 48 includes a protrusion that extends outward from the lower surface of the disc 32 or the upper surface of the base receptacle 12. In the exemplary embodiment shown in the figures, the return channel 46 is formed in the upper surface of the base receptacle 12, and the return tab 48 is positioned on the lower surface of the disc 32. The resilient component 44 is positioned in the return channel 46 such that a first end of the resilient component 44 contacts a first end surface of the return channel 46. The return tab 48 is positioned on the lower surface of the disc 32 such that the return tab 48 contacts a second end of the resilient component 44. And, as the locking cover 28 rotates from the (locked) first rotational angular position to the (unlocked) second rotational angular position, the return tab 48 compresses the resilient component 44. Compression of the resilient component 44 tends to urge or bias the return tab 48, the disc 32, and the locking component 44 to rotate back to the (locked) first rotational angular position.

Figure 4:
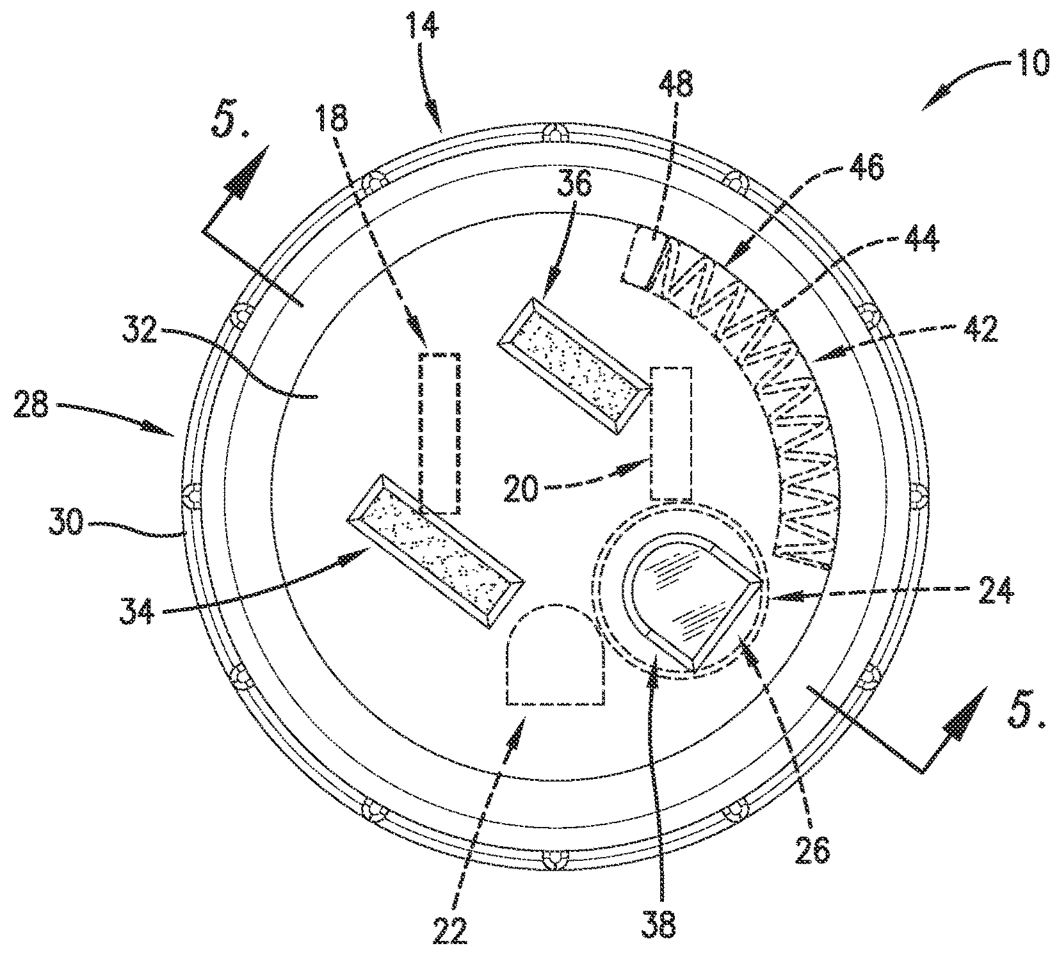
FIG. 4 is a top view of the locking power cord receptacle, showing the locking assembly in a locked state with the locking cover in a first rotational angular position.
Figure 5:
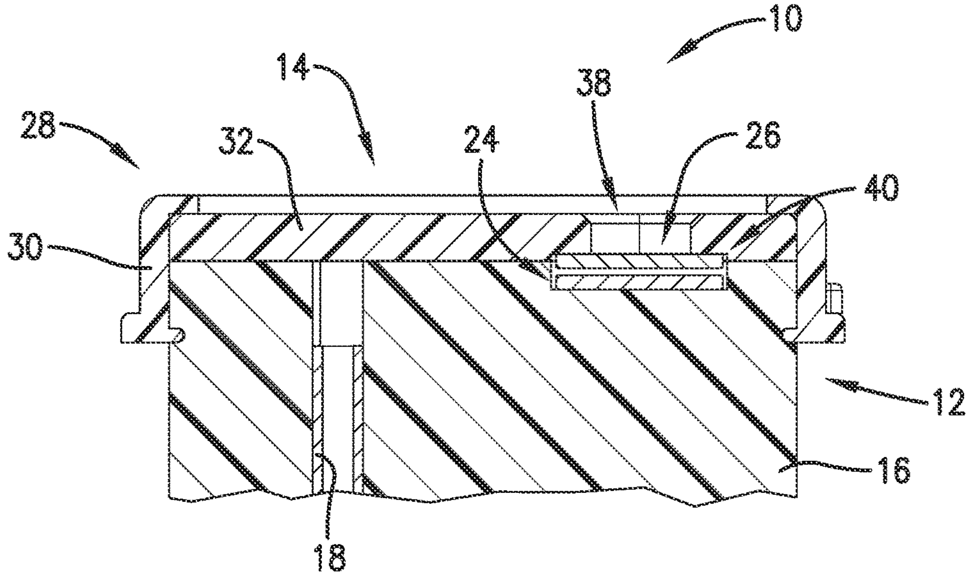
FIG. 5 is a side sectional view of the locking power cord receptacle, cut along line 5-5 of FIG. 4, with the locking assembly in the locked state.

The locking power cord receptacle 10 may operate as follows. Referring to FIGS. 4 and 5, the locking assembly 14 is normally in the locked state. That is, the locking cover 28 is in the locked rotational angular position so that access to the base receptacle 12 is blocked because the disc 32 of the locking cover 28 physically covers the receptacle connectors 18, 20, 22. The locking cover 28 is held in the locked rotational angular position by the locking component 26 being in the locked configuration, i.e., being urged or biased into the cover cavity 40, to prevent rotation of the locking cover 28.

Figure 7:
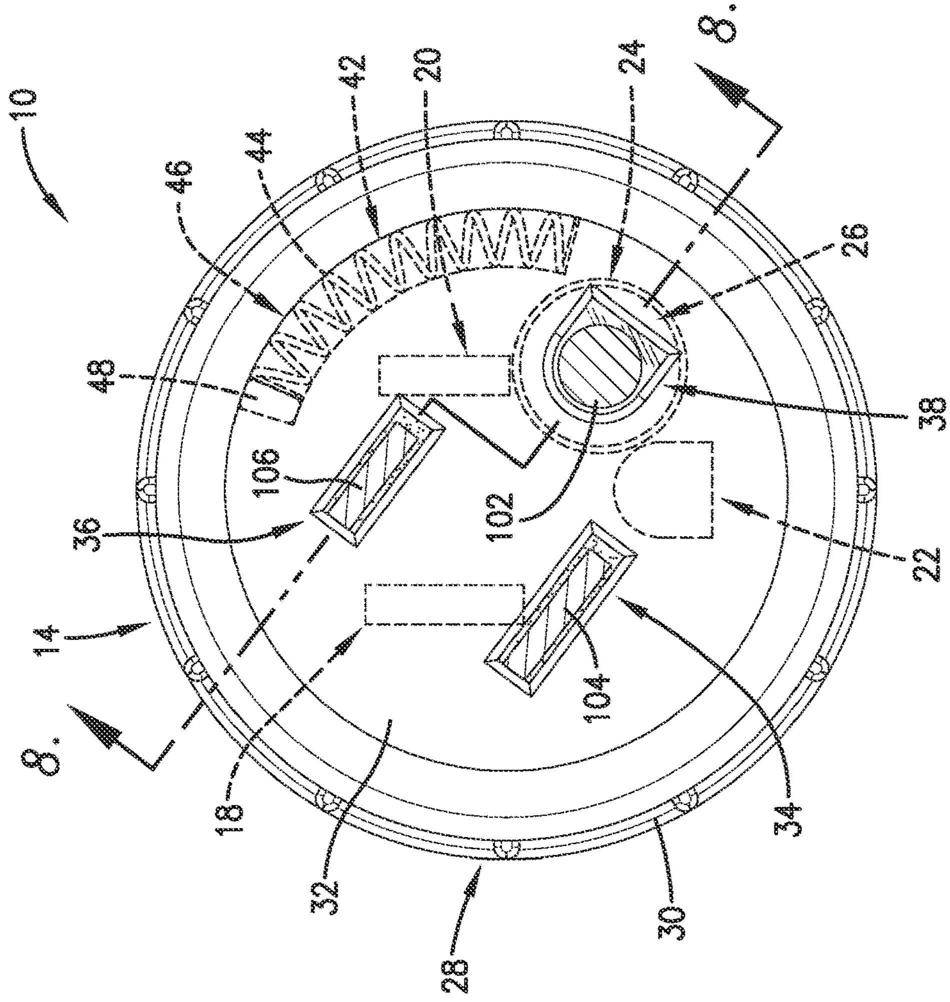
FIG. 7 is a top view of the locking power cord receptacle, showing sectional views of the ground pin and the prongs positioned in the openings of the disc of the locking cover, and showing the locking cover still in the first rotational angular position.
Figure 6:
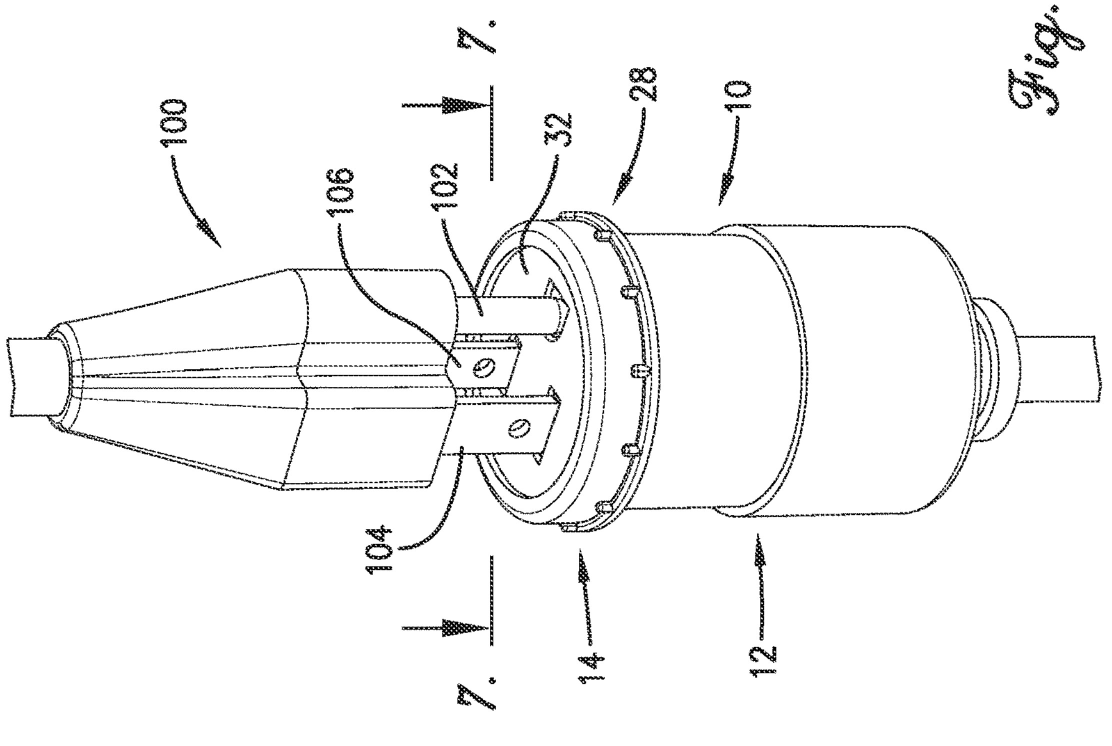
FIG. 6 is a side elevational view of the locking power cord receptacle and the electric power cord plug, with the electric power cord plug in preparation to unlock the locking assembly and be plugged in; (applying downward pressure on the locking component and changing the locking component from a locked configuration to an unlocked configuration)
Figure 9:
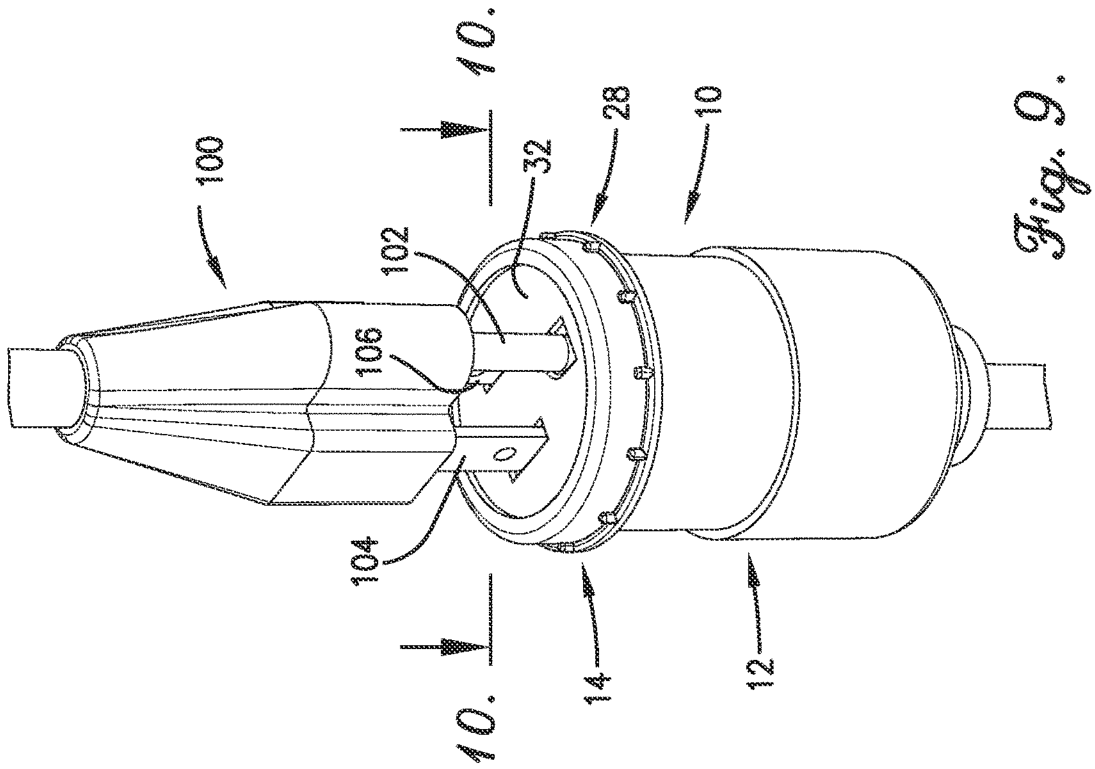
FIG. 9 is a side elevational view of the locking power cord receptacle and the electric power cord plug, with the ground pin maintaining downward pressure on the locking component and the locking cover having been rotated from the first rotational angular position.
Figure 8:
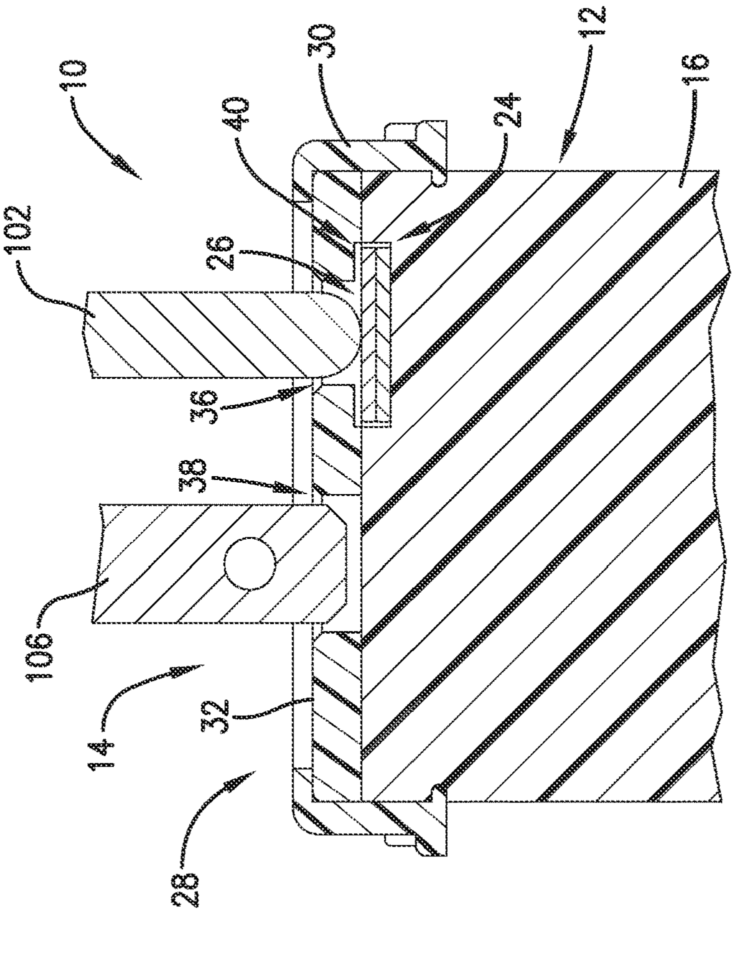
Figure 10:
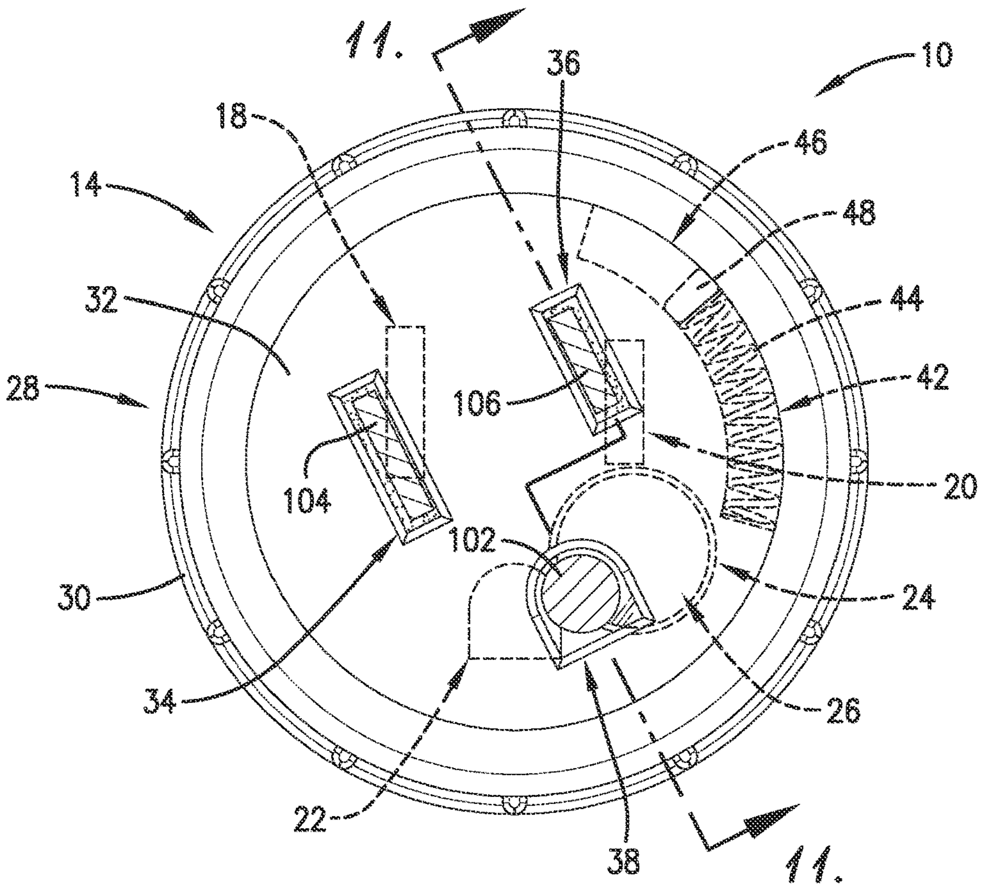
FIG. 10 is a top view of the locking power cord receptacle, showing sectional views of the ground pin and the prongs positioned in the openings of the disc of the locking cover, and showing the locking cover having been rotated from the first rotational angular position.
Figure 11:
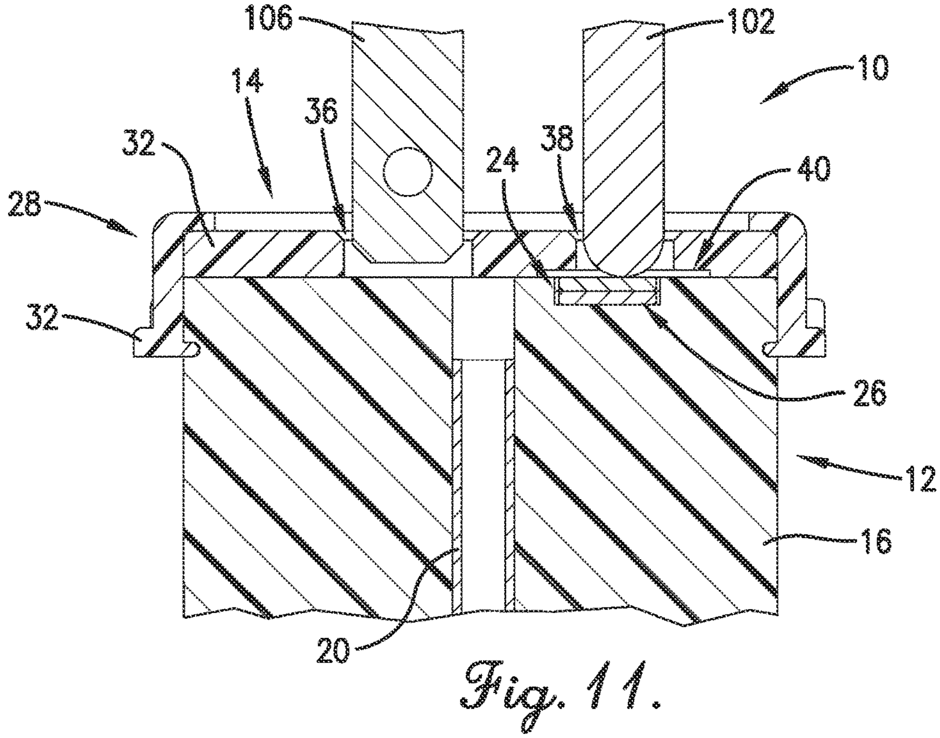
FIG. 11 is a side sectional view of the locking power cord receptacle, cut along line 11-11 of FIG. 10, with the ground pin maintaining downward pressure to the locking component.
Figure 13:
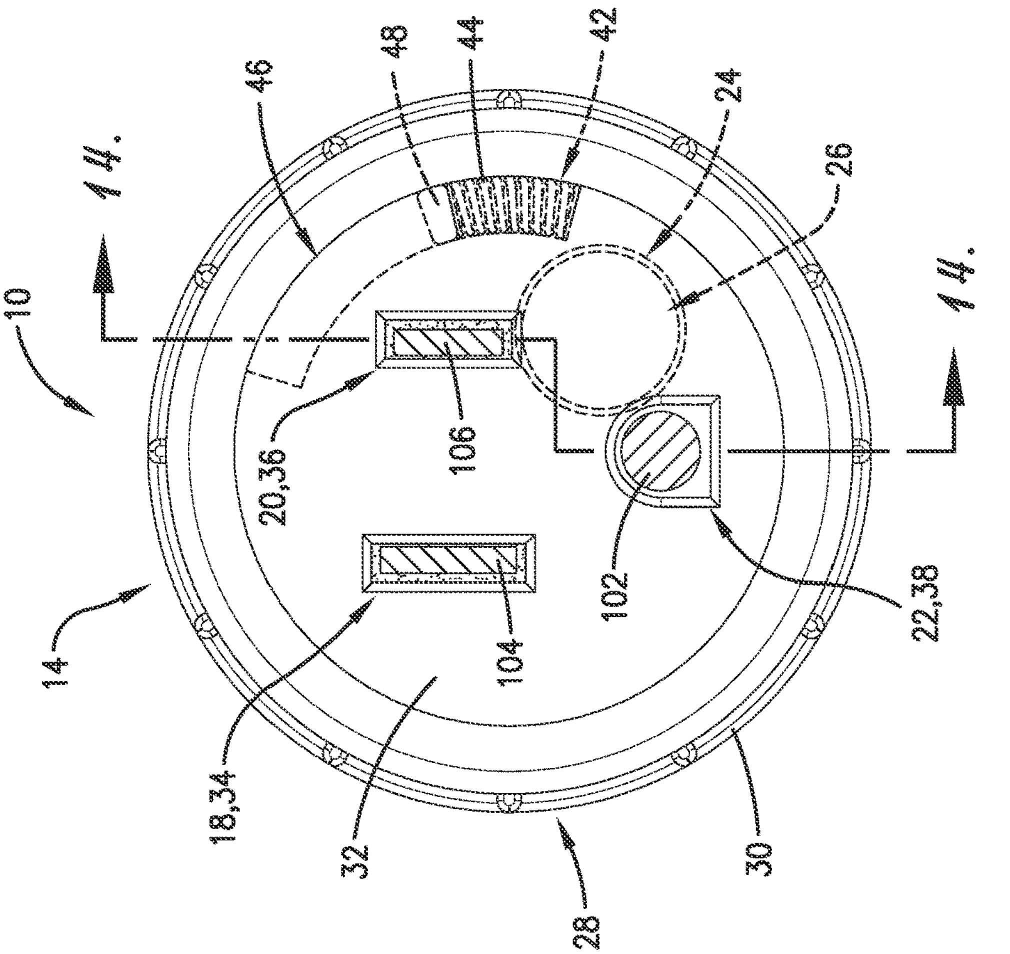
FIG. 13 is a top view of the locking power cord receptacle, showing sectional views of the ground pin and the prongs positioned in the openings of the disc of the locking cover and being plugged into the base receptacle after the locking cover has been unlocked and rotated to the second rotational angular position.
Figure 12:
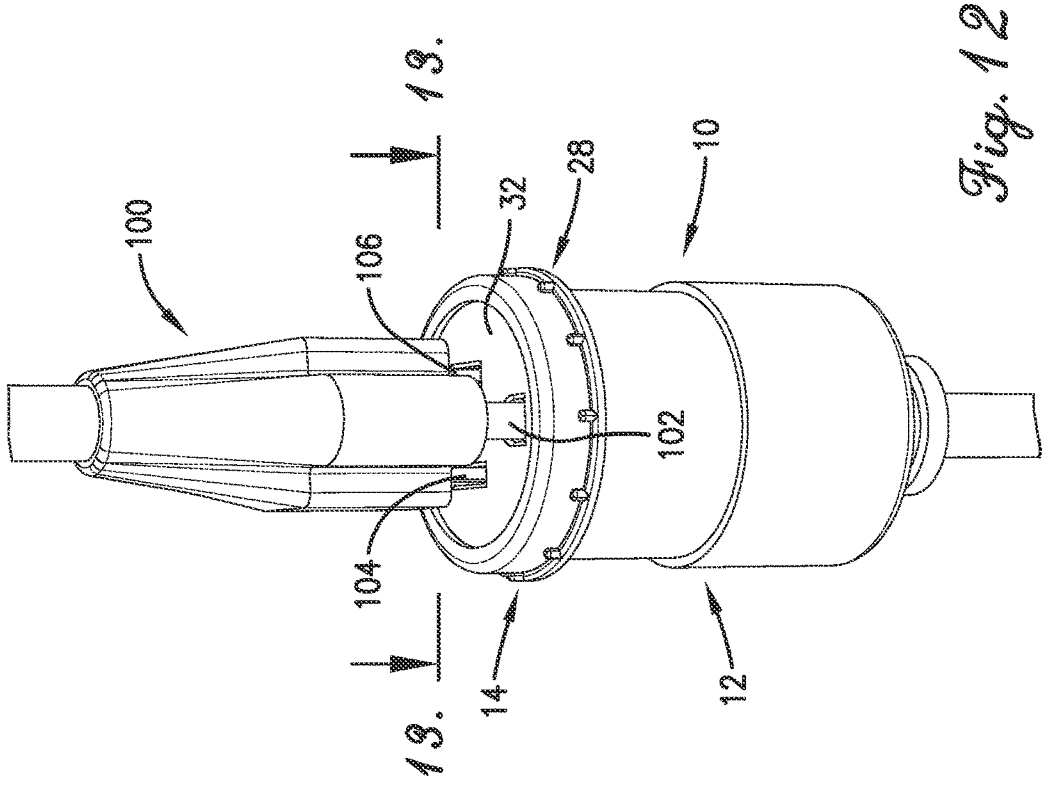
FIG. 12 is a side elevational view of the locking power cord receptacle and the electric power cord plug, showing the locking assembly in an unlocked state with the locking cover in a second rotational angular position and the electric power cord plug plugged into the base receptacle.
Figure 14:
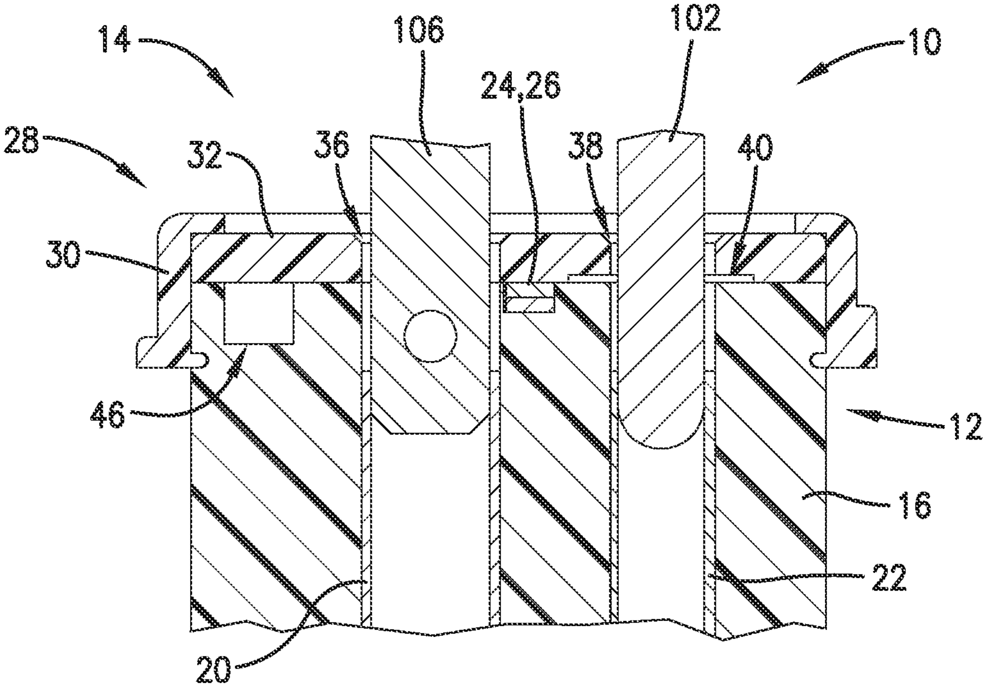
FIG. 14 is a side sectional view of the locking power cord receptacle, cut along line 14-14 of FIG. 13, showing the electric power cord plug plugged into the base receptacle.
Figure 15:
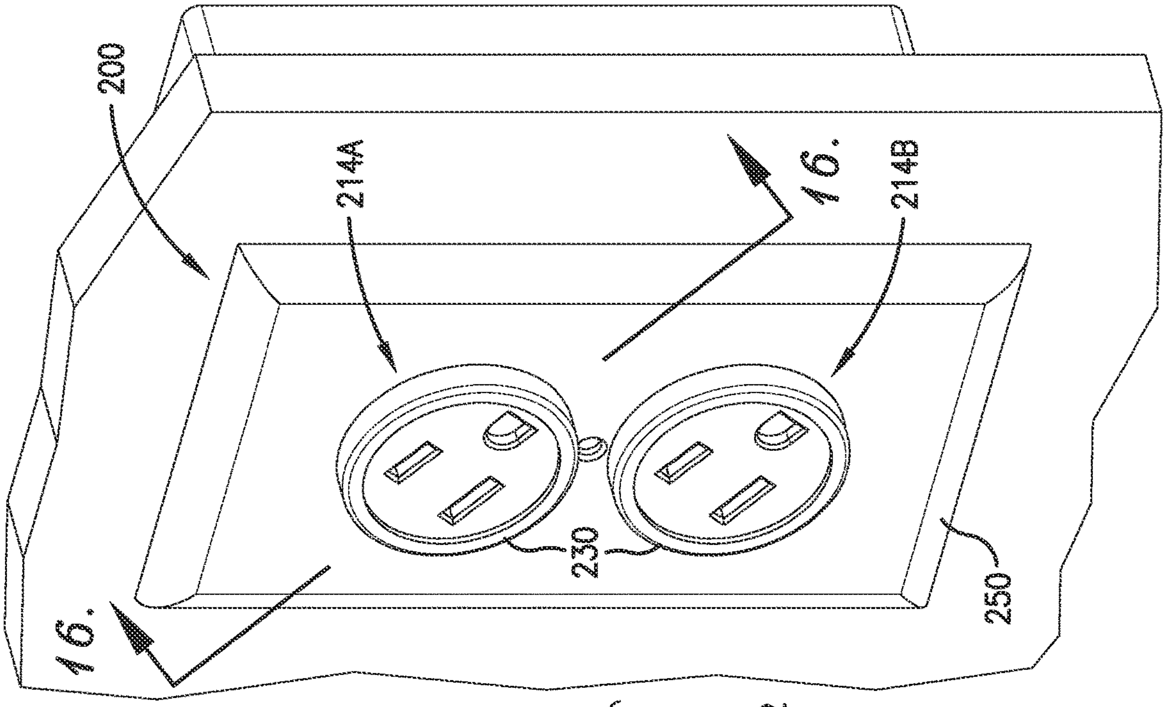
FIG. 15 is a perspective view of a locking wall outlet, constructed in accordance with other embodiments of the current invention.
Figure 15:
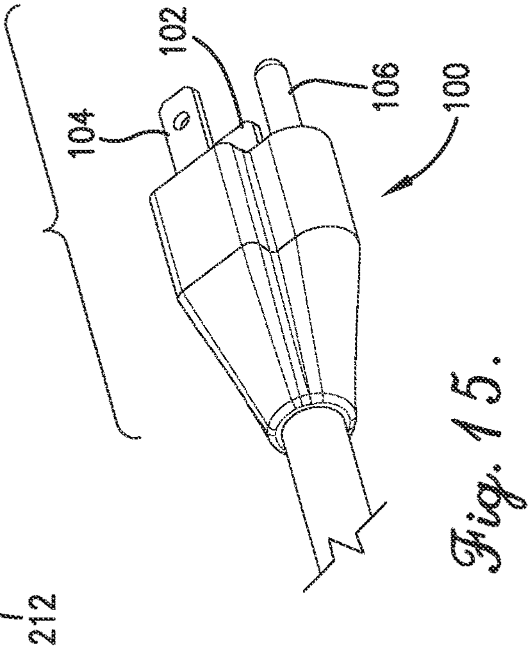
Figure 16:
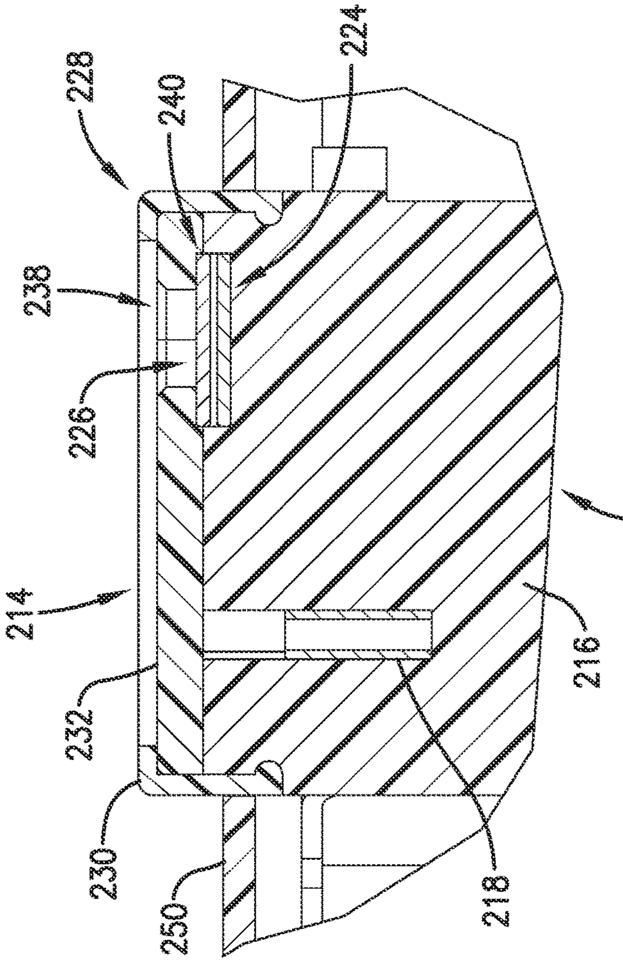
FIG. 16 is a sectional view of the locking wall outlet cut along the line 16-16 of FIG. 15.
Figure 17:
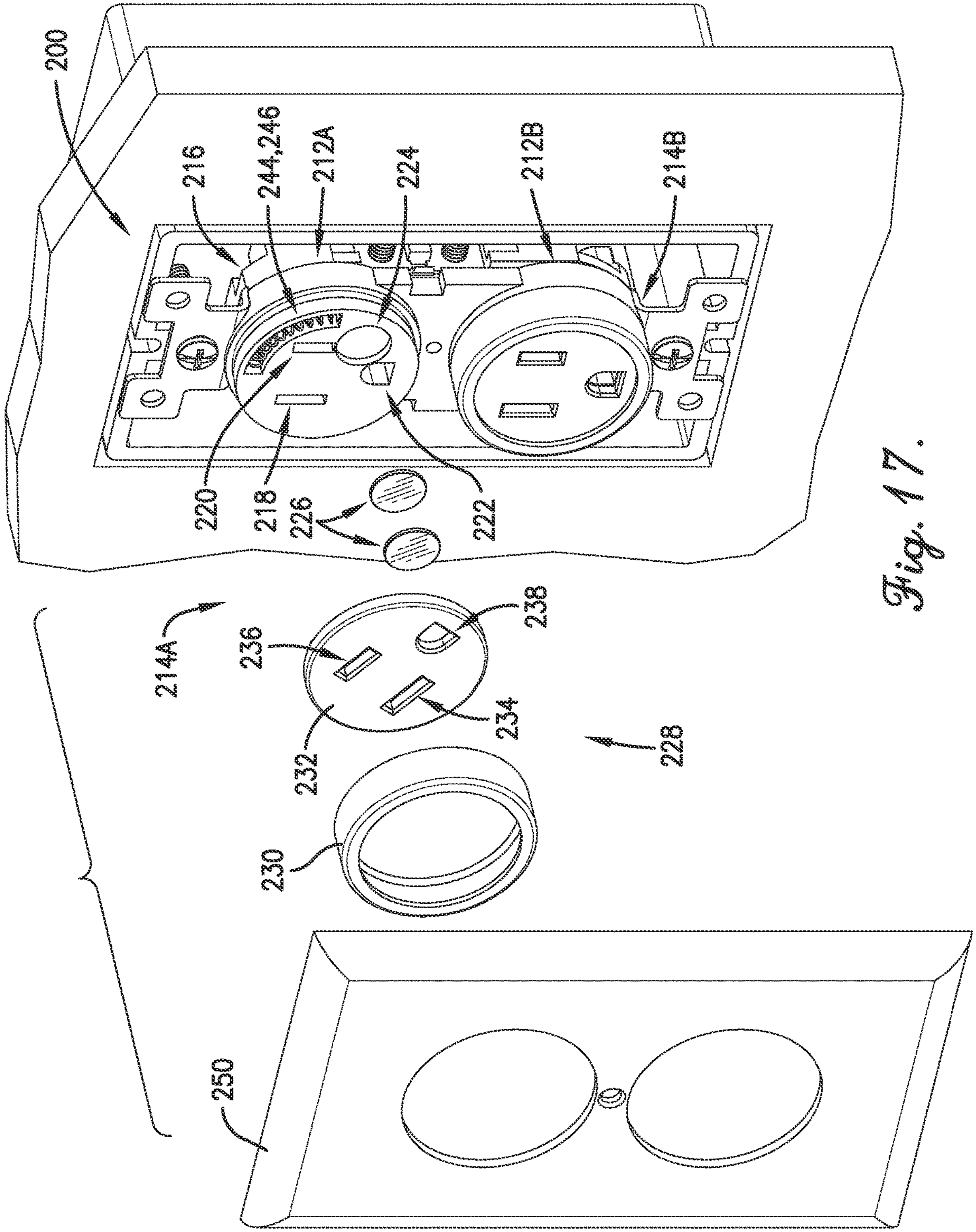
FIG. 17 is an exploded view of a portion of the locking wall outlet from a forward perspective.
Figure 18:
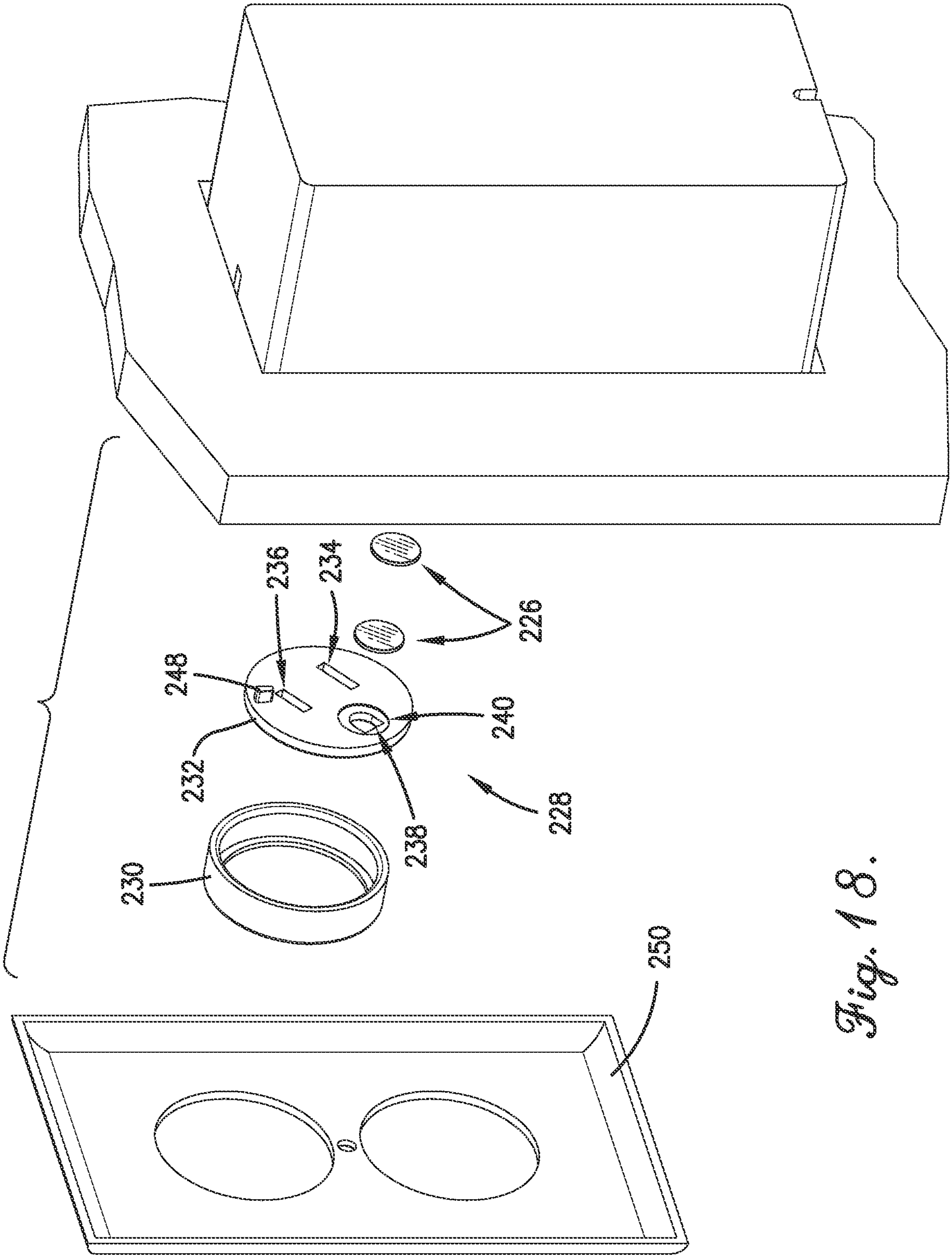
FIG. 18 is an exploded view of the portion of the locking wall outlet from a rear perspective.

To unlock the locking assembly 14, the ground pin 102 from the three-prong electric power cord plug 100 is inserted into the ground pin opening 38 on the locking cover 28. Referring to FIGS. 6-8, the ground pin 102 contacts the locking component 26 and downward (generally surface normal) pressure is applied to the locking component 26 to change it from the locked configuration to the unlocked configuration. When the locking component 26 is pushed and retracts from of the cover cavity 40 (and the locking component 26 is in the unlocked configuration), the locking cover 28 is manually rotated from the locked rotational angular position, as shown in FIGS. 9-11. The locking cover 28 is further rotated to the unlocked rotational angular position, as shown in FIGS. 12-14, so that the first connector opening 34, the second connector opening 36, and the ground pin opening 38 on the disc 32 are aligned with the first female connector 18, the second female connector 20, and the ground female connector 22, respectively, on the base receptacle 12. The first blade connector 104, the second blade connector 106, and the ground pin 102 are pushed into the base receptacle 12 and make physical and electrical contact with the first female connector 18, the second female connector 20, and the ground female connector 22, respectively.

When the electrical connection is no longer needed, the electric power cord plug 100 is removed from the base receptacle 12. The return mechanism 42 automatically rotates the locking cover 28 from the unlocked rotational angular position to the locked rotational angular position. With the locking cover 28 in the locked rotational angular position, the locking component 26 is urged or biased from the unlocked configuration to the locked configuration, and a portion of the locking component 26 enters and occupies the cover cavity 40.

Referring to FIGS. 15-18, a locking wall outlet 200 that broadly comprises first and second base receptacles 212 and first and second locking assemblies 214 is shown. The first locking assembly 214A is associated and operational with the first base receptacle 212A, and the second locking assembly 214B is associated and operational with the second base receptacle 212B. The locking wall outlet 200 is mounted on a wall in a residence or building and is typically configured to receive two electric power cord plugs 100. Each base receptacle 212 is similar to the base receptacle 12, although the base receptacles 212 may be connected to one another, and each locking assembly 214 is similar to the locking assembly 14. The wall outlet 200 further includes a cover plate 250. In addition, the locking wall outlet 200 may include a box or housing and mounting hardware to mount the base receptacles 212 to the box.

Each base receptacle 212 includes a body 216, a first female connector 218, a second female connector 220, and a ground female connector 222. Each of these components is the same as, or very similar to, the like named components described above. The body 216 of the first base receptacle 212A is connected or coupled to the body 216 of the second base receptacle 212B.

Each locking assembly 214 includes a body cavity 224, a locking component 226, and a locking cover 228. The locking cover 228 includes a sleeve 230, a disc 232, a first connector opening 234, a second connector opening 236, a ground pin opening 238, a cover cavity 240, and a return mechanism 242. The return mechanism 242 may include a resilient component 244, a return channel 246, and a return tab 248. Each of these components is the same as, or very similar to, the like named components described above.

The locking wall outlet 200 may operate in a similar manner to the locking power cord receptacle 10, as described above. That is, each locking assembly 214 is normally in the locked state. When a user wants to use the locking wall outlet 200, he inserts the ground pin 102 of the three-prong electric power cord plug 100 into the ground pin opening 238 on the locking cover 228 and pushes on the locking component 226. The first blade connector 104 and the second blade connector 106 also enter the first connector opening 234 and the second connector opening 236, respectively, similar to what is shown in FIGS. 6-8. The user rotates the three-prong electric power cord plug 100 until the ground pin 102, the first blade connector 104, and the second blade connector 106 align with the ground female connector 222, the first female connector 218, and the second female connector 220, respectively. The user then pushes the ground pin 102, the first blade connector 104, and the second blade connector 106 all the way into the base receptacle 212 of the locking wall outlet 200.

When the ground pin 102, the first blade connector 104, and the second blade connector 106 of the three-prong electric power cord plug 100 are pulled out of the base receptacle 212, the return mechanism 242 automatically rotates the locking cover 228 from the unlocked rotational angular position to the locked rotational angular position, and the locking assembly 214 is in the locked state again.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A locking power cord receptacle configured to receive an electric power cord plug that includes a ground pin, the locking power cord receptacle comprising:
- a base receptacle including a first female connector, a second female connector, and a ground female connector, each including an opening positioned on an upper surface and arranged to receive the electric power cord plug, the base receptacle further including a body cavity positioned on the upper surface; and
- a locking assembly having a locked state in which the locking assembly blocks access to the base receptacle and an unlocked state in which the electric power cord plug can be plugged in to the base receptacle, the locking assembly including
  - a locking cover including
    - a disc which covers the connectors of the base receptacle when the locking assembly is in the locked state, the disc including a cover cavity, and
    - a sleeve connected to the disc and rotatably coupled to the base receptacle, and a locking component retained in the body cavity in the base receptacle, the locking component including first and second magnets positioned in the cover cavity such that the two magnets repel one another, the locking component having a locked configuration in which a portion of the locking component extends into the cover cavity and an unlocked configuration in which the portion of the locking component retracts from the cover cavity and the locking cover is able to rotate and change the state of the locking assembly, the locking component configured to be pressed by the ground pin to change from the locked configuration to the unlocked configuration.

2. The locking power cord receptacle of claim 1, wherein the disc further includes a first connector opening configured to receive a first blade connector of the electric power cord plug, the first connector aligned with the first female connector when the locking assembly is in the unlocked state, a second connector opening configured to receive a second blade connector of the electric power cord plug, the second connector aligned with the second female connector when the locking assembly is in the unlocked state, and a ground pin opening configured to receive the ground pin, the ground pin opening aligned with the ground female connector when the locking assembly is in the unlocked state.

3. The locking power cord receptacle of claim 2, wherein the first connector opening is not aligned with the first female connector when the locking assembly is in the locked state, the second connector opening is not aligned with the second female connector when the locking assembly is in the locked state, and the ground pin opening is not aligned with the ground female connector when the locking assembly is in the locked state.

4. The locking power cord receptacle of claim 2, wherein the cover cavity is aligned with the ground pin opening.

5. The locking power cord receptacle of claim 1, wherein the locking cover has a first rotational angular position relative to the base receptacle when the locking assembly is in the locked state and a second rotational angular position relative to the base receptacle when the locking assembly is in the unlocked state.

6. The locking power cord receptacle of claim 1, wherein the locking component is configured to receive a generally surface normal force to change from the locked configuration to the unlocked configuration.

7. The locking power cord receptacle of claim 1, wherein the locking component is configured to receive a generally surface normal force from the ground pin.

8. The locking power cord receptacle of claim 1, wherein the sleeve of the locking cover overlaps a portion of the base receptacle and includes an inner surface flange that extends into a circumferential groove on the base receptacle so that the locking cover rotates about the base receptacle.

9. The locking power cord receptacle of claim 1, further comprising:

a return channel positioned in the disc or in the base receptacle and having an arcuate shape;

a coil spring positioned in the return channel and having a first end in contact with a first end of the return channel, the spring configured to urge the locking component into the locked configuration; and a return tab positioned on the disc or on the base receptacle and configured to contact a second end of the spring.

10. The locking power cord receptacle of claim 1, wherein the first magnet extends into the cover cavity when the locking component is in the locked configuration and is out of the cover cavity when the locking component is in the unlocked configuration.

11. A locking power cord receptacle configured to receive an electric power cord plug that includes a ground pin, the locking power cord receptacle comprising:

a base receptacle including a first female connector, a second female connector, and a ground female connector, each including an opening positioned on an upper surface and arranged to receive the electric power cord plug, the base receptacle further including a body cavity positioned on the upper surface; and a locking assembly having a locked state in which the locking assembly blocks access to the base receptacle and an unlocked state in which the electric power cord plug can be plugged in to the base receptacle, the locking assembly including a locking cover including a disc which covers the connectors of the base receptacle when the locking assembly is in the locked state, the disc including a cover cavity and a first connector opening configured to receive a first blade connector of the electric power cord plug, a second connector opening configured to receive a second blade connector of the electric power cord plug, and a ground pin opening configured to receive the ground pin, and a sleeve connected to the disc and rotatably coupled to the base receptacle, and a locking component retained in the body cavity in the base receptacle, the locking component including first and second magnets positioned in the cover cavity such that the two magnets repel one another, the locking component having a locked configuration in which a portion of the locking component extends into the cover cavity and an unlocked configuration in which the portion of the locking component retracts from the cover cavity and the locking cover is able to rotate and change the state of the locking assembly.

12. The locking power cord receptacle of claim 11, wherein the first connector opening aligns with the first female connector when the locking assembly is in the unlocked state and is not aligned with the first female connector when the locking assembly is in the locked state, the second connector opening aligns with the second female connector when the locking assembly is in the unlocked state and is not aligned with the second female connector when the locking assembly is in the locked state, and the ground pin opening aligns with the ground female connector when the locking assembly is in the unlocked state and is not aligned with the ground female connector when the locking assembly is in the locked state.

13. The locking power cord receptacle of claim 11, wherein the cover cavity is aligned with the ground pin opening.

14. The locking power cord receptacle of claim 11, wherein the locking cover has a first rotational angular position relative to the base receptacle when the locking assembly is in the locked state and a second rotational angular position relative to the base receptacle when the locking assembly is in the unlocked state, the locking cover including a return mechanism configured to urge the locking cover to the first rotational angular position, the return mechanism including a resilient component configured to apply a force to the disc to urge the locking cover to the first rotational angular position, a return channel positioned on the disc or on the base receptacle and configured to retain the resilient component, and a return tab positioned on the disc or on the base receptacle and configured to contact the resilient component.

15. The locking power cord receptacle of claim 11, wherein the locking component is configured to receive a generally surface normal force from the ground pin to change from the locked configuration to the unlocked configuration.

16. A locking wall outlet configured to receive one or more electric power cord plugs, each electric power cord plug including a ground pin, the locking wall outlet comprising:

first and second base receptacles coupled to one another, each base receptacle including a first female connector, a second female connector, and a ground female connector, with each connector including an opening positioned on an upper surface and arranged to receive one electric power cord plug, each base receptacle further including a body cavity positioned on the upper surface;

a first locking assembly associated and operational with the first base receptacle and a second locking assembly associated and operational with the second base receptacle, each locking assembly having a locked state in which the locking assembly blocks access to the associated base receptacle and an unlocked state in which the electric power cord plug can be plugged in to the associated base receptacle, each locking assembly including a locking cover including a disc which covers the connectors of the associated base receptacle when the locking assembly is in the locked state, the disc including a cover cavity, and a sleeve connected to the disc and rotatably coupled to the associated base receptacle, and a locking component retained in the body cavity in the associated base receptacle, the locking component including first and second magnets positioned in the cover cavity such that the two magnets repel one another, the locking component having a locked configuration in which a portion of the locking component extends into the cover cavity and an unlocked configuration in which the portion of the locking component retracts from the cover cavity and the locking cover is able to rotate and change the state of the locking assembly, the locking component being pressed by the ground pin to change from the locked configuration to the unlocked configuration.

17. The locking wall outlet of claim 16, wherein the disc of the locking cover of each locking assembly includes a first connector opening that aligns with the first female connector when the locking assembly is in the unlocked state and is not aligned with the first female connector when the locking assembly is in the locked state, a second connector opening that aligns with the second female connector when the locking assembly is in the unlocked state and is not aligned with the second female connector when the locking assembly is in the locked state, and a ground pin opening that aligns with the ground female connector when the locking assembly is in the unlocked state and is not aligned with the ground female connector when the locking assembly is in the locked state.

18. The locking wall outlet of claim 17, wherein the cover cavity of each locking assembly is aligned with the ground pin opening.

19. The locking wall outlet of claim 16, wherein the locking cover of each locking assembly has a first rotational angular position relative to the associated base receptacle when the locking assembly is in the locked state and a second rotational angular position relative to the associated base receptacle when the locking assembly is in the unlocked state, the locking cover including a return mechanism configured to urge the locking cover to the first rotational angular position, the return mechanism including a resilient component configured to apply a force to the disc to urge the locking cover to the first rotational angular position, a return channel positioned on the disc or on the associated base receptacle and configured to retain the resilient component, and a return tab positioned on the disc or on the associated base receptacle and configured to contact the resilient component.

20. The locking wall outlet of claim 16, wherein the locking component of each locking assembly is configured to receive a generally surface normal force from the ground pin to change from the locked configuration to the unlocked configuration.

* * * * *